(12) United States Patent
Riedel

(10) Patent No.: US 11,272,654 B2
(45) Date of Patent: Mar. 15, 2022

(54) TOWED AGRICULTURAL IMPLEMENT

(71) Applicant: AGCO International GmbH, Neuhausen (CH)

(72) Inventor: Jürgen Riedel, Schwanstetten (DE)

(73) Assignee: AGCO International GmbH, Neuhausen (CH)

( * ) Notice: Subject to any disclaimer, the term of this patent is extended or adjusted under 35 U.S.C. 154(b) by 308 days.

(21) Appl. No.: 16/508,792

(22) Filed: Jul. 11, 2019

(65) Prior Publication Data

US 2020/0015407 A1    Jan. 16, 2020

(30) Foreign Application Priority Data

Jul. 12, 2018    (GB) .................................... 1811406

(51) Int. Cl.
*A01B 63/16*  (2006.01)
*A01B 59/042*  (2006.01)
(Continued)

(52) U.S. Cl.
CPC .......... *A01B 63/163* (2013.01); *A01B 59/042* (2013.01); *A01B 63/166* (2013.01); *A01D 78/10* (2013.01); *A01B 21/00* (2013.01)

(58) Field of Classification Search
CPC ..... A01B 63/163; A01B 63/166; A01B 21/00; A01B 59/042; A01D 78/1092;
(Continued)

(56) References Cited

U.S. PATENT DOCUMENTS 3,377,788 A  *  4/1968  Pickrell .............. A01D 78/1092
                                                    56/377
4,914,901 A  *  4/1990  Aron .................... A01D 78/105
                                                    56/370
(Continued)

FOREIGN PATENT DOCUMENTS

DE      2514493 A1    11/1975
DE    20321819 U1    11/2010
(Continued)

OTHER PUBLICATIONS

European Patent Office, Search Report for related EP Application No. 19 17 5273, dated Dec. 13, 2019.
(Continued)

*Primary Examiner* — Jamie L McGowan

(57) ABSTRACT

A towed agricultural implement includes one or more processing units each supported on a chassis, in which each chassis supports at least one processing unit on a central axis, the chassis having a left hand side wheel assembly support and a right hand side wheel assembly support, free ends of the wheel assembly supports having wheel assemblies, each wheel assembly comprising a wheel mounted on a wheel mount, the wheel mount being rotatable about an inclined axis, and the wheel being rotatable about a horizontal axis. The wheel assembly supporting structures and the wheel mounts allow limited relative movement of each wheel mount with respect to the wheel assembly supporting structures which enables greater control when the towed agricultural implement is towed about a corner.

13 Claims, 7 Drawing Sheets

(51) Int. Cl.
*A01D 78/10* (2006.01)
*A01B 21/00* (2006.01)

(58) Field of Classification Search
CPC .. A01D 78/105; A01D 78/1035; A01D 78/10; A01D 78/1042
See application file for complete search history.

(56) References Cited

U.S. PATENT DOCUMENTS

| | | | | |
|---|---|---|---|---|
| 4,922,700 A * | 5/1990 | Aron | ............... | A01D 78/1071 56/370 |
| 5,060,465 A * | 10/1991 | Jerome | ............... | A01D 78/125 56/367 |
| 5,548,949 A * | 8/1996 | Gantzer | ............... | A01D 78/105 56/367 |
| 5,586,421 A * | 12/1996 | Aron | ............... | A01D 78/105 56/367 |
| 5,791,133 A * | 8/1998 | Krone | ............... | A01D 78/125 56/367 |
| 5,862,659 A * | 1/1999 | Aron | ............... | A01D 78/1085 56/367 |
| 5,960,620 A * | 10/1999 | Wright | ............... | A01D 80/00 56/15.9 |
| 6,164,051 A * | 12/2000 | van der Lely | ............... | A01D 57/20 56/367 |
| 6,272,826 B1 * | 8/2001 | Menichetti | ............... | A01D 78/1007 56/367 |
| 6,467,249 B2 * | 10/2002 | Demanet | ............... | A01D 78/1078 56/367 |
| 6,748,730 B2 * | 6/2004 | Breneur | ............... | A01D 78/1085 56/367 |
| 7,377,093 B2 * | 5/2008 | Underhill | ............... | A01D 78/125 56/379 |
| 8,578,690 B2 * | 11/2013 | Hoerner | ............... | A01D 78/1042 56/192 |
| 8,915,054 B2 * | 12/2014 | Speich | ............... | A01D 7/06 56/400 |
| 9,149,000 B2 * | 10/2015 | Bassett | ............... | A01D 78/144 |
| 9,198,356 B2 * | 12/2015 | Hoerner | ............... | A01D 78/1014 |
| 10,264,730 B2 * | 4/2019 | Wagner | ............... | A01D 78/1085 |
| 2001/0025473 A1 * | 10/2001 | Demanet | ............... | A01D 78/1014 56/367 |
| 2006/0288684 A1 * | 12/2006 | Van Den Engel | ............... | A01B 73/00 56/367 |
| 2010/0084149 A1 | 4/2010 | Kovach et al. | | |
| 2013/0000268 A1 * | 1/2013 | Arnold | ............... | A01B 73/067 56/367 |
| 2013/0118141 A1 * | 5/2013 | Arnold | ............... | A01D 78/105 56/367 |
| 2015/0359162 A1 * | 12/2015 | Needham | ............... | A01C 5/068 172/1 |
| 2016/0309654 A1 * | 10/2016 | Riedel | ............... | A01D 78/1014 |
| 2020/0077565 A1 * | 3/2020 | Gembler | ............... | A01B 73/044 |
| 2021/0120744 A1 * | 4/2021 | Fillep | ............... | A01D 78/12 |

FOREIGN PATENT DOCUMENTS

| | | |
|---|---|---|
| EP | 0455022 A1 | 11/1991 |
| EP | 0630554 A1 | 12/1994 |
| EP | 3 434 088 A1 | 1/2019 |
| WO | 2011/112077 A1 | 9/2011 |

OTHER PUBLICATIONS

UK Intellectual Property Office, Search Report for related UK Application No. 081811406.6, dated Jan. 9, 2019.

* cited by examiner

TOWED AGRICULTURAL IMPLEMENT

BACKGROUND

Field

The present disclosure relates to a towed agricultural implement and in particular a towed hay tool including one or more processing units. The present disclosure has particular use for a towed agricultural implement incorporating multiple rotors for a rake or tedder.

Description of Related Art

It is known to support the working implement or implements of a towed agricultural implement on a wheeled chassis. Such a chassis typically includes a towing bar by which the chassis is connected to an agricultural vehicle such as a tractor. The chassis is provided with sets of ground-engaging wheels to the left hand and right hand sides of the chassis to support the chassis as the agricultural implement is towed.

The ground-engaging wheels may be of the caster kind and so are free to swivel about a vertical axis. The control of such ground-engaging wheels when the towed agricultural implement is towed around a corner is known to cause problems. One solution is to use non-pivoting wheel assemblies instead of those of caster type, but this removes the advantage of using caster-type wheels. Further, when the towed agricultural implement is turned, rigid non-pivoting wheels will tend to rub or skid over the ground and can damage the sward to be raked.

An alternative solution where the towed implement is connected by way of a three-point hitch is to raise the towed agricultural implement when turning such that the wheels of the towed agricultural implement no longer engage the ground.

Further problems may be encountered when using caster-type wheel arrangements with steering of the towed agricultural implement when towed across a sloping ground surface when one set of ground-engaging wheels is higher up the slope than the other, in that the wheels will tend away from the direction of travel. One solution is to provide lockable pivoting wheels that may be engaged into a fixed rigid orientation prior to use of the towed agricultural implement on a slope to prevent pivoting of the wheels. However, this requires resetting of the wheel assemblies before and after use of the towed agricultural implement on a slope.

The present disclosure has as an advantage an alternative solution to these problems.

SUMMARY

According to a first aspect of the present disclosure, a towed agricultural implement includes one or more processing units each supported on a chassis, in which each chassis supports a processing unit on a central axis, the chassis being provided with a left hand side wheel assembly supporting structure and a right hand side wheel assembly supporting structure, free ends of the wheel assembly supporting structures being provided with wheel assemblies, each wheel assembly comprising a wheel mounted on a wheel mount, the wheel mount being rotatable about an inclined axis and the wheel being rotatable about a horizontal axis, is characterized in that the wheel assembly supporting structures and the wheel mounts are adapted to allow limited relative movement of each wheel mount with respect to the wheel assembly supporting structures.

Preferably, the wheels of the wheel assemblies are prevented from being directed towards the central axis of the chassis.

Preferably, the central axis of the chassis is a longitudinal axis of the chassis.

Preferably, the wheel assembly supporting structures comprise a lead portion and a trailed portion, in which the lead portion is angled away from the trailing portion.

More preferably, each of the lead portion and the trailing portion comprises an outer vertical surface and a vertical end surface.

Preferably, each wheel mount comprises a carrying member mounted for rotation about the inclined axis, the carrying member comprising an arm extending to the front and rear of the inclined axis. More preferably, movement of the wheel mount in a first direction is limited by a rear surface of a first end of the arm coming into contact with the wheel assembly supporting structure.

Preferably, the first end of the arm includes a rear surface from which an axle extends. More preferably, movement of the mount in a second direction is limited by a second end of the arm coming into contact with the wheel assembly supporting structure.

Preferably, the second end of the arm includes an elbow comprising a first part extending from the carrying member and a second part extending at an angle to the first part, the second part including an inner vertical surface and a vertical end surface.

Preferably, the limited relative movement of each wheel mount with respect to the wheel assembly supporting structures is between a first end position and a second end position, the first and second end positions of a first wheel assembly at a first free end of one of the wheel assembly supporting structures being substantially parallel to the first and second end positions of a second wheel assembly at a second end of that wheel assembly supporting structure.

Preferably, the chassis comprises a longitudinal element and a lateral element having first and second ends, the lateral element being connected to a second end of the longitudinal element, the left hand side wheel assembly supporting structure being provided at the first end of the lateral element and the right hand side wheel assembly supporting structure being provided at the second end of the lateral element. More preferably, the wheel assembly supporting structures are mounted at the ends of the lateral element for pivoting movement about a pivot axis.

Preferably, each processing unit comprises a rotor for a rake or a tedder.

Preferably, the towed agricultural implement further comprises a support structure connecting each processing unit to a connector for connecting the support structure to a towing vehicle.

BRIEF DESCRIPTION OF THE DRAWINGS

The disclosure will now be described, by way of example only, with reference to the accompanying drawings, in which.

DETAILED DESCRIPTION

Figure 1:
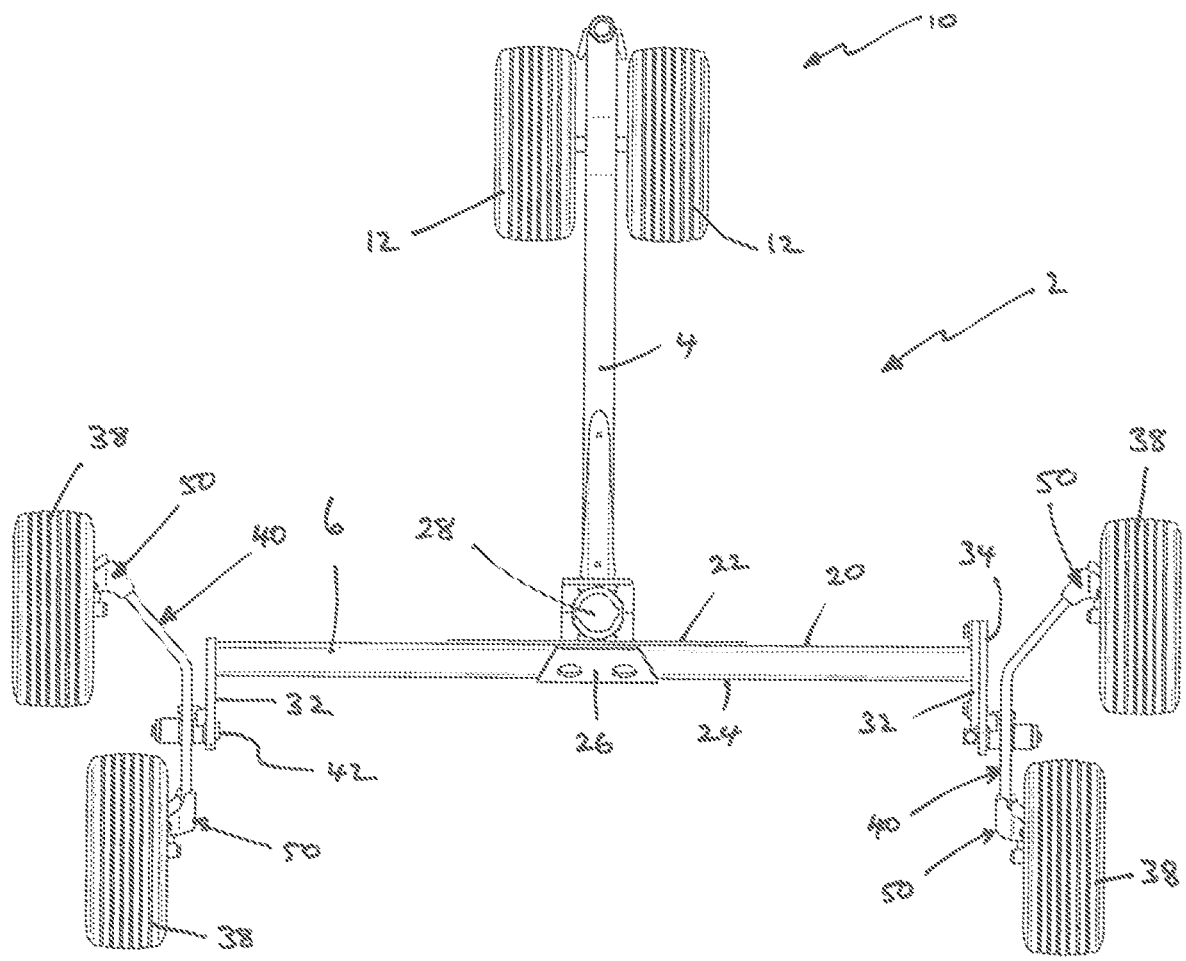
FIG. 1 shows a view from above of a chassis for an agricultural implement in accordance with the present disclosure in a first position.

The disclosure will now be described in the following detailed description with reference to the drawings, wherein embodiments are described in detail to enable practice of the disclosure. Although the disclosure is described with reference to these specific embodiments, it will be understood that the disclosure is not limited to these embodiments. But to the contrary, the disclosure includes numerous alternatives, modifications and equivalents as will become apparent from consideration of the following detailed description.

Reference to terms such as longitudinal, transverse, and vertical are made with respect to a longitudinal axis that is parallel to a normal forward direction of travel. Reference to terms such as forward, lead, or rear are made with respect to a normal forward direction of travel.

The towed agricultural implement is substantially symmetrical about its longitudinal axis. Reference to a part on one side will include a reference to a like part on the other side unless stated to the contrary.

Like parts will be referred to by like reference numerals.

Figure 2:
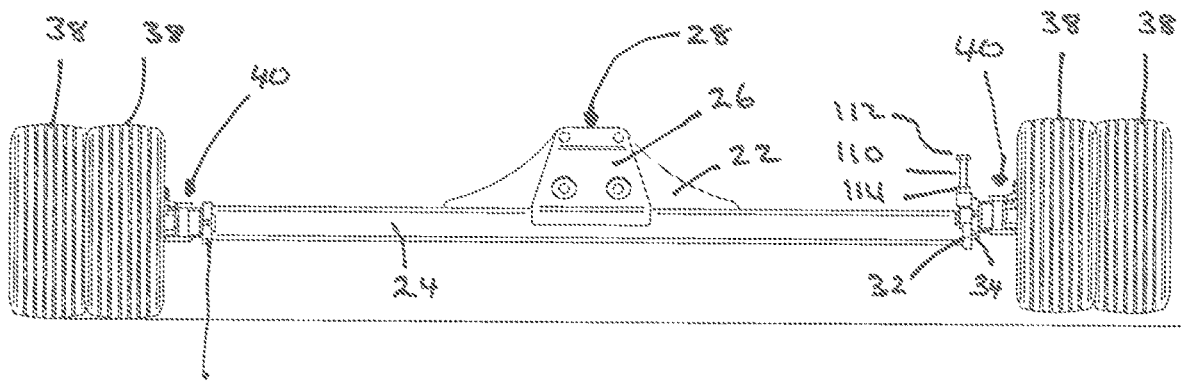
FIG. 2 shows and end view of the chassis of FIG. 1.

With reference to FIGS. 1 and 2, a chassis 2 is shown in a first neutral position corresponding to the towed agricultural implement being towed on a flat surface along a straight line. The chassis 2 can be seen to comprise a framework including a central longitudinally extending element 4 and a laterally extending element 6. When being towed in a straight line, the longitudinally extending element 4 corresponds to a longitudinal axis of the chassis (and so of the towed implement as a whole). A first end of the longitudinally extending element 4 is provided with a wheel assembly 10. The wheel assembly 10 has two wheels 12 supported on a common axle 14. The axle 14 is connected at the lower end of a pivot member 16 (FIGS. 4 and 5), the upper end of which is connected at the first end of the longitudinally extending element 4 for rotation about a vertical axis 18. As can be seen from FIGS. 4 and 5, the vertical axis 18 is offset from the common axle 14.

In the illustrated embodiment, the laterally extending element 6 is substantially planar. A front face 20 of a central region of the laterally extending element 6 is provided with a substantially vertical plate 22 extending upwards from the laterally extending element 6. A second end of the longitudinally extending element 4 is connected to the vertical plate 22. A bracket 26 extends from a rear surface 24 of the laterally extending element 6 to an upper region of the vertical plate 22. The longitudinally extending element 4, the laterally extending element 6, the vertical plate 22 and the bracket 26 may be formed of any suitable material and be connected in any suitable manner. For example, they may be constructed from a metal such as steel and connected by welding.

The upper region of the vertical plate 22 is provided with a mounting point 28 upon which a processing unit 30 such as rotor for a rake or tedder may be mounted. A guard rail assembly (not shown) and a towing structure (not shown) may be connected to the processing unit 30. By way of example, the towing structure is conveniently provided with a suitable connector, such as a three-point hitch, for connecting the towed agricultural implement to an agricultural vehicle for towing.

A first end and a second end of the laterally extending element 6 are respectively provided with first and second wheel support structures 40.

Figure 7:
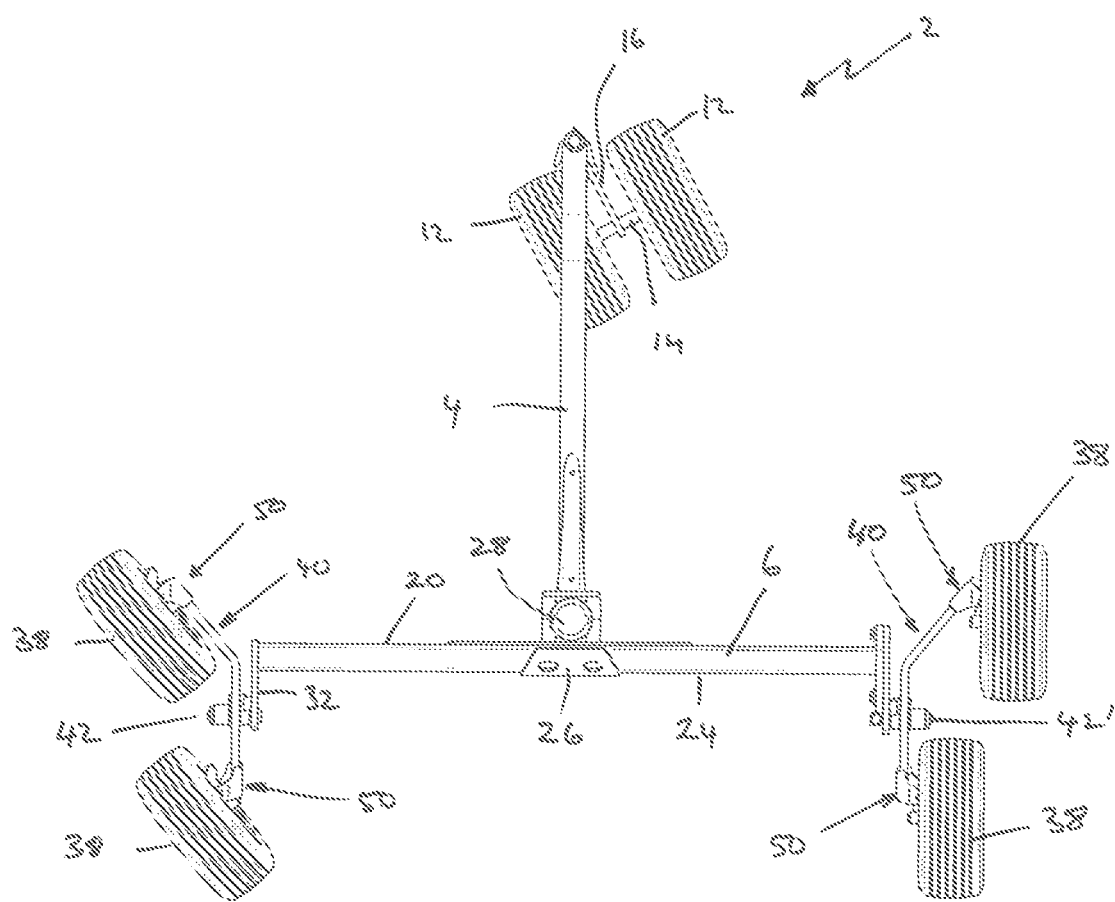
FIG. 7 shows a view similar to FIG. 1 with the chassis in the second position.
Figure 8:
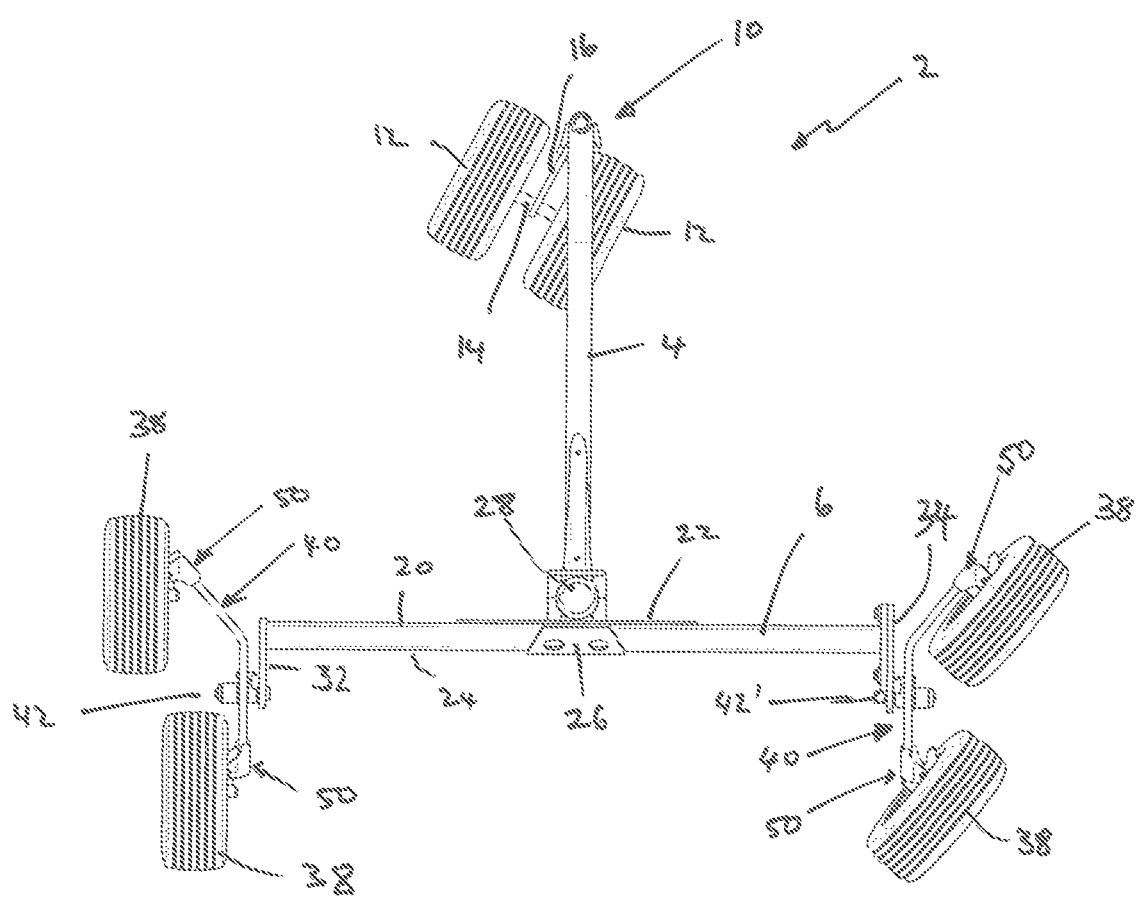
FIG. 8 shows a view similar to FIG. 1 with the chassis in a third position.

At the first, left hand end, a longitudinally extending support element 32 extends from a first end at the laterally extending element 6 and is connected to a wheel support structure 40 at a second end. The wheel support structure 40 is conveniently pivotally connected about a pivot axis 42 to the second end of the longitudinally extending support element 32 (as shown to the left of FIGS. 1, 7, and 8).

In an alternative construction, illustrated at the second, right hand end, an intermediate longitudinal support element 34 may be secured, in any suitable manner, for example by threaded fasteners, to the longitudinally extending support element 32. The intermediate longitudinal support element 34 may extend beyond a rear end of the longitudinally extending support element 32. The wheel support structure 40 is conveniently pivotally connected about a pivot axis 42' to a free end of the intermediate longitudinal support element 34 (as shown to the right of FIGS. 1, 7, and 8).

Figure 5:
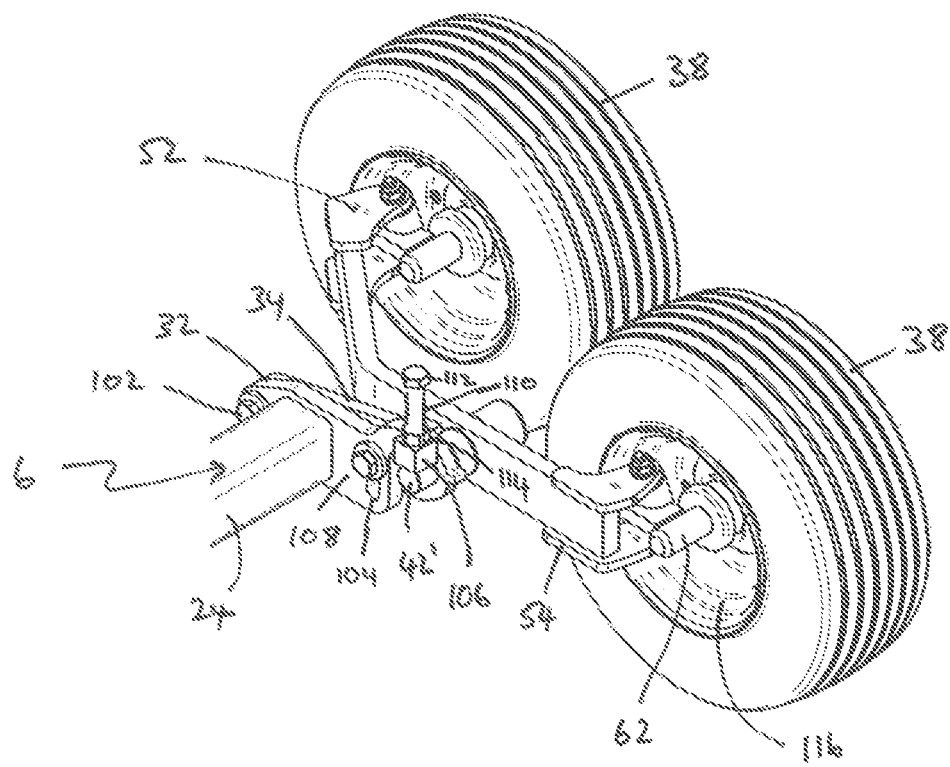
FIG. 5 shows a detail of the chassis and wheel support structure of FIG. 1 with the wheel support structure raised with respect to the chassis.
Figure 6:
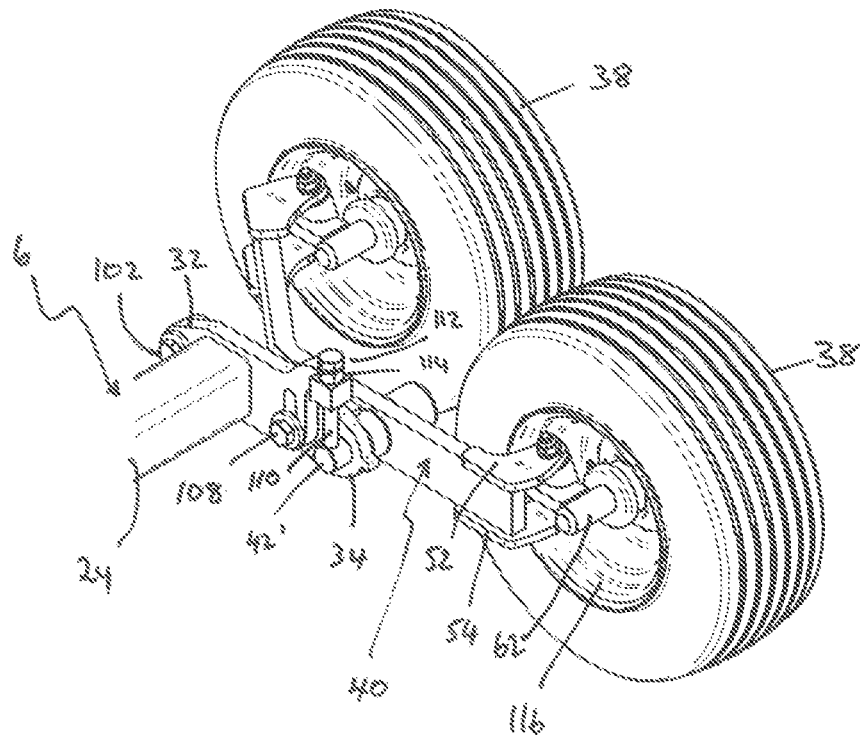
FIG. 6 shows a detail of the chassis and wheel support structure corresponding to FIG. 5 with the wheel support structure lowered with respect to the chassis.

In the illustrated embodiment, as best shown in FIGS. 2, 5, and 6, this alternative construction allows for movement of the pivot axis 42' about a second pivot axis 102 so as to allow vertical adjustment of the position of the pivot axis 42'. In this way, the inclination of the chassis 4—and so the carried processing unit 30—may be adjusted. The longitudinally extending support element 32 and the intermediate longitudinal support element 34 are connected for relative movement about the second pivot axis 102.

A rear end of the longitudinally extending support element 32 is provided with a substantially vertical slot 104 and an upper rearwardly extending nose including a stop 106 with a substantially vertical through bore extending from a top surface of the stop 106 through to the lower surface of the stop 106.

A rear end of the intermediate longitudinal support element 34 is provided with a first inwardly extending generally horizontal headed shaft 108 and is also provided with an upwardly extending threaded connector shaft 110 extending from the pivot axis 42'. The generally horizontal shaft 110 passes through the vertical slot of the longitudinally extending support element 32 such that the head is located on the inside of the longitudinally extending support element 32.

The connector shaft 110 is provided with an upper end stop 112 at an end remote from the pivot axis 42'. The connector shaft 110 is arranged through the vertical through bore of the longitudinally extending support element 32. An internally threaded member 114 on the threaded connector shaft 110 can be adjusted from a lowermost position (FIG. 5) to an uppermost position (FIG. 6) in order to control the degree of movement of the intermediate longitudinal support element 34 with respect to the longitudinally extending support element 32. No movement is permitted in FIG. 5. Maximum movement is permitted in FIG. 6.

Figure 3:
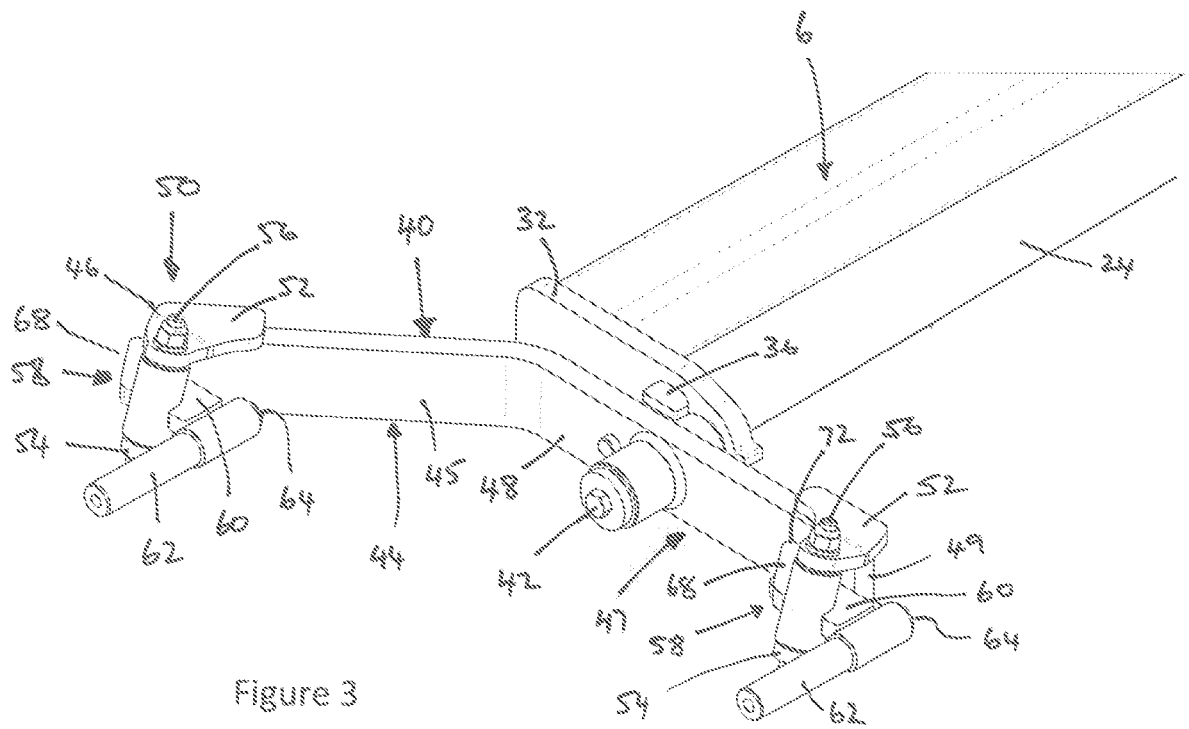
FIG. 3 shows a detail of a wheel support structure forming part of the chassis of FIG. 1 in the first position.
Figure 4:
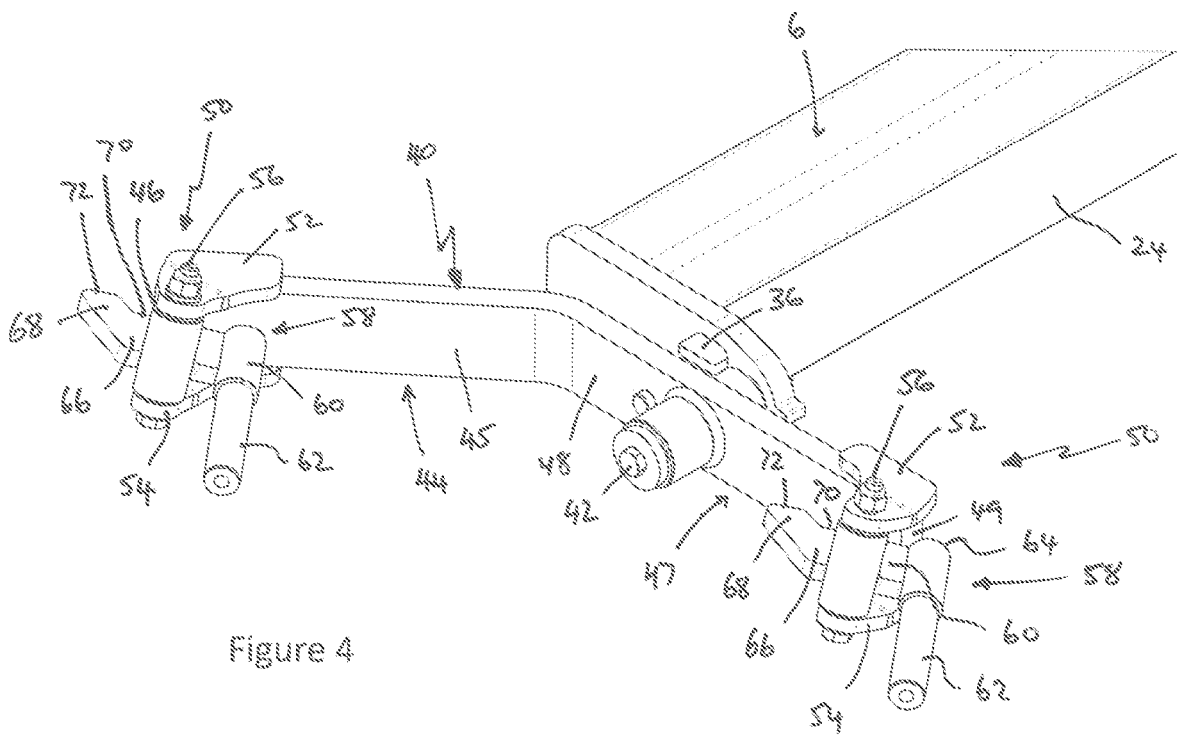
FIG. 4 shows a detail of the wheel support structure of FIG. 2 in a second position.

By way of example, the wheel support structure 40 at the left hand end of the laterally extending element 6 of FIG. 1 is shown in more detail in FIGS. 3 and 4. The wheel support structure at the right hand end (FIGS. 5 and 6) will be seen to correspond and is not discussed separately.

The wheel support structure 40 comprises a generally planar elongate member having an upper generally horizontal surface. The wheel support structure 40 comprises a leading portion 44 and a trailing portion 47. The pivot axis 42 extends through the trailing portion 47 of the wheel support structure 40. The longitudinally extending support element 32 is provided with a laterally extending element 36. The laterally extending element 36 functions as an abutment stop to limit pivoting movement of the wheel support structure 40 about the pivot axis 42.

The leading portion 44 of the wheel support structure 40 further comprises an outer vertical surface 45 and a vertical end surface 46. The trailing portion 47 of the wheel support structure 40 further comprises an outer vertical surface 48 and a vertical end surface 49.

Free ends of the wheel support structure 40 are provided with upper and lower support brackets 52, 54 from which a wheel mount 50 of a wheel assembly is supported. The wheel assembly conveniently comprises an outer wheel rim in the form of a tire 38 surrounding a hub 116 (FIGS. 5 and 6). The hub 116 is mounted on a central axle 62 for rotation about said axle 62.

The upper and lower brackets 52, 54 are of any suitable material, for example a metal such as steel, and may secured to the respective ends of the wheel support structure 40 in any suitable manner, for example by welding. The free ends of the upper and lower brackets 52, 54 are angled slightly upwards. The free ends of the upper and lower brackets 52, 54 are adapted to support a spindle 56. Due to the angle of the free ends of the upper and lower brackets 52, 54, the spindle 56 is slightly inclined to the vertical.

The wheel mount 50 further comprises a carrying member 58 extending to the front and rear of the spindle 56. The carrying member 58 is adapted to pivot about the spindle 56. The spindle 56 may be supported between the upper and lower brackets 52, 54 in any suitable manner. For example, a threaded fastener may extend between upper and lower brackets 52, 54, and the spindle 56 may be provided with a bushing between the threaded fastener and the spindle.

The carrying member 58 comprises an arm 60 extending to the front and rear of the spindle 56. To the rear, the arm 60 carries a spindle extending outwards. The spindle forms the axle 62 for the associated wheel assembly 38. The arm 60 includes a rear surface 64 behind the spindle. At the front, the arm 60 includes an elbow comprising a first part 66 extending from the carrying member 58 and a second part 68 extending at an angle to the first part 66. The second part 68 can be seen to include an inner vertical surface 70 and a vertical end surface 72.

In the neutral position shown in FIGS. 1, 2, and 3, each of the wheel assemblies 38 provided on the wheel support structures 40 of the laterally extending element 6 are aligned with the direction of travel (as are the two wheels 12 provided on the longitudinally extending element), that is they each are aligned on a longitudinal axis parallel to the longitudinal axis of the chassis. In each wheel support structure 40, the front wheel and the rear wheel are laterally offset from one another.

The wheel assemblies to the left of the towed implement are prevented from moving to the right. In the case of the front wheel assembly, this is because the inner vertical surface 70 of the front of the arm is in contact with the vertical surface 46 at the free end of the lead portion 44 of the wheel support structure 40. In the case of the rear wheel assembly, this is because the end vertical surface 72 of the front of the arm is in contact with vertical surface 48 of the trailing portion 47 of the wheel support structure 40.

It will be understood that in in a corresponding arrangement to the right hand side of the towed implement, the wheel assemblies are prevented in a similar manner from moving to the left.

When the towing agricultural vehicle makes a left turn (FIG. 7), the wheel assemblies 38 to the left of the chassis 2 of the towed agricultural implement are induced to take the position shown in FIGS. 4 and 5. As the towed implement turns, the inner wheels are moved inwards and the outer wheels are kept aligned with the longitudinal axis of the towed agricultural implement.

As shown in FIG. 4, the carrying members of the left hand side rotate about the spindles 56 away from the position shown in FIG. 3 until in the case of the front wheel assembly, the rear surface 64 at the rear of the first part of the arm 60 behind the axle 62 is in contact with the outer surface 45 of the lead portion 44 of the wheel support structure 40 and in the case of the rear wheel assembly the rear surface 64 at the rear of the first part of the arm 60 behind the axle 62 is in contact with at least part of the vertical end surface 49 of the trailing portion 47 of the wheel support structure 40.

At the right hand side of the towed implement, the wheel assemblies remain prevented from moving to the left.

When the towed implement is then towed to the right (FIG. 8), the left hand wheel set is returned to the position shown in FIGS. 1 and 2 and prevented from turning inward. At the right hand side, the wheel assemblies will be free to rotate until in the case of the front wheel assembly, a rear surface at the rear of a first part of the arm behind the axle is in contact with the outer surface of the lead portion of the wheel support structure and in the case of the rear wheel assembly the rear surface at the rear of the first part of the arm behind the axle is in contact with at least part of the vertical end surface of the trailing portion of the wheel support structure.

Figure 9:
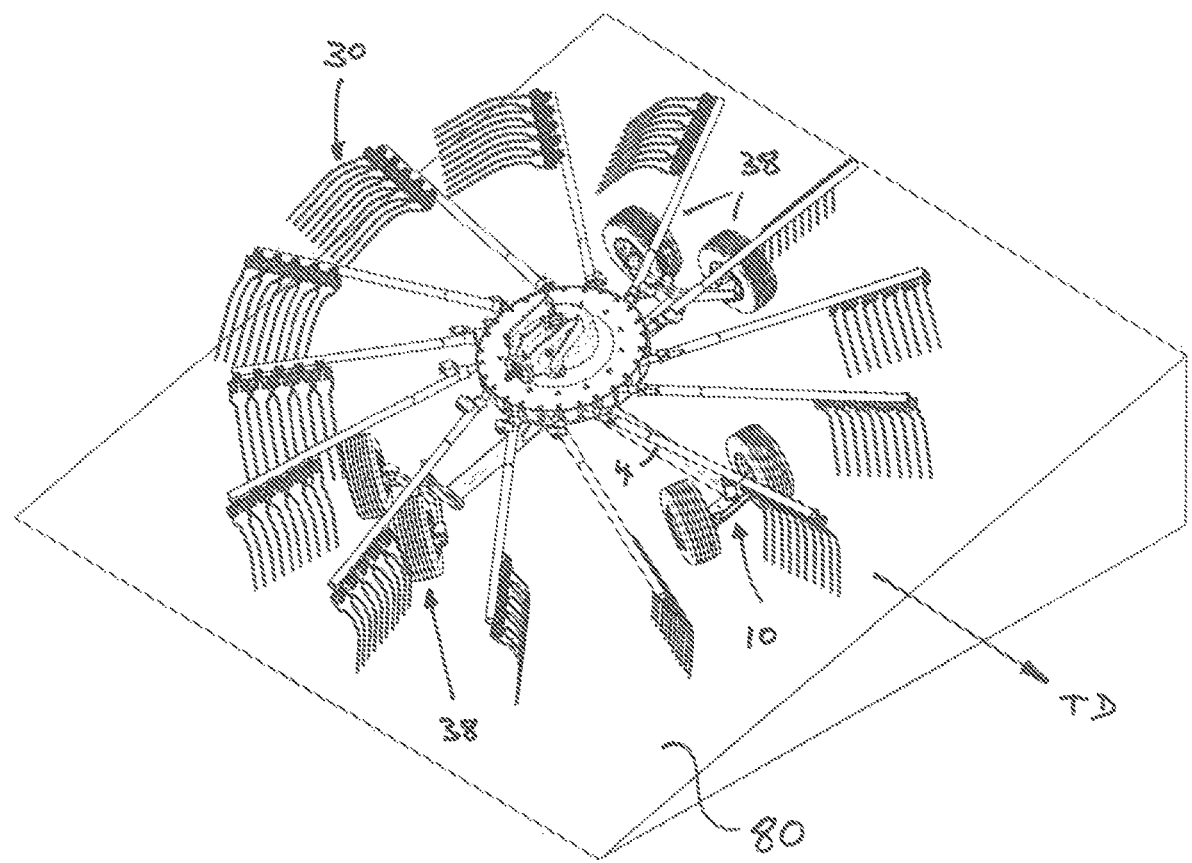
FIG. 9 shows a perspective view of a towed agricultural implement in accordance with present disclosure.

Turning now to FIG. 9, a towed implement is shown on a slope 80 being towed in a forward travelling direction TD. The support structure has been omitted for clarity. A processing unit 30 in the form of a rotor for a rake is shown mounted on the mounting point of the chassis. The upper wheels, in the illustrated embodiment, those on the left hand side of the towed agricultural implement are maintained in the forward direction of travel and take over the lateral guidance of the towed agricultural implement. The wheels on right left hand side are free to turn to the right, as are the wheels 12 of the wheel assembly 10 on the end of the longitudinally extending element 4, and both sets of wheels have done so.

Figure 10:
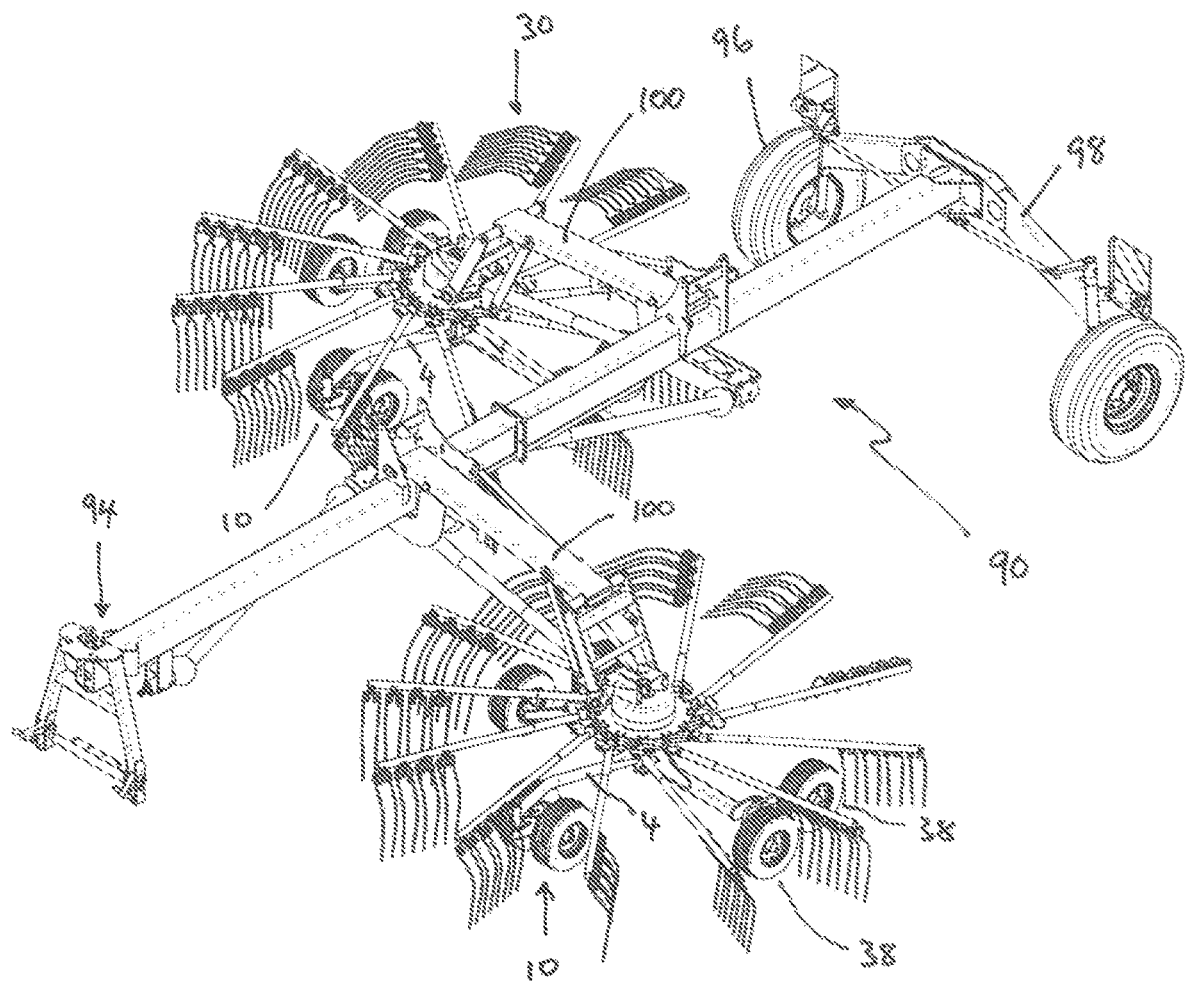
FIG. 10 shows a perspective view of a towed agricultural implement in accordance with the present disclosure incorporating two operating implements.

FIG. 10 shows a towed agricultural implement 90 incorporating multiple processing units 30. Again, the processing units are shown as rotors for a rake. In the illustrated embodiment, a central support structure is shown having a central towing bar 92 provided at a first end with a connector 94, for example a three-point hitch, for connecting the towed agricultural implement 90 to an agricultural vehicle (not shown), and at a second end with a pair of steerable trailing wheels 96 supported on a support beam 98. The central support structure further comprises mounting arms 100, each mounting arm being connected at a first end to the central towing bar 92. In the illustrated embodiment, two mounting arms 100 are shown, one extending to each side of the central towing bar 92. Each mounting arm 100 may be moved between an operating position (shown) and a transport position in which the mounting arms 100 are raised to a substantially vertical position (not shown).

Each mounting arm 100 is connected at a second end to a processing unit 30. Each processing unit 30 is provided with a chassis 2 in accordance with the present disclosure.

From reading the present disclosure, other modifications will be apparent to persons skilled in the art. Such modifications may involve other features which are already known in the field of towed agricultural implements and component parts therefore and which may be used instead of or in addition to features already described herein.

What is claimed is:

1. A towed agricultural implement comprising:
    at least one processing unit supported on a central axis of a chassis, the chassis comprising a left wheel assembly support and a right wheel assembly support,
    wherein free ends of the left and right wheel assembly supports each have a wheel assembly, each wheel assembly comprising a wheel mount with a wheel, wherein the wheel mount is rotatable about an inclined axis and the wheel is rotatable about a horizontal axis,
    wherein the wheel assembly supports and the wheel mounts are configured to allow movement of the wheel mount with respect to the wheel assembly supports,
    wherein the wheel assembly supports comprise a lead portion and a trailed portion configured such that the lead portion is angled away from the trailed portion,
    wherein each wheel mount comprises a carrying member configured to rotate about the inclined axis and having an arm extending to a front and a rear of the inclined axis.

2. The towed agricultural implement according to claim 1, wherein the wheels of the wheel assemblies are prevented from being directed towards the central axis of the chassis.

3. The towed agricultural implement according to claim 1, wherein the central axis of the chassis is a longitudinal axis of the chassis.

4. The towed agricultural implement according to claim 1, wherein the lead portion and the trailed portion each comprise an outer vertical surface and a vertical end surface.

5. The towed agricultural implement according to claim 1, wherein movement of the carrying member in a first direction is limited by a rear surface of a first end of the arm coming into contact with the wheel assembly support.

6. The towed agricultural implement according to claim 5, wherein the first end of the arm includes a rear surface from which an axle extends.

7. The towed agricultural implement according to claim 1, wherein movement of the carrying member in a second direction is limited by a second end of the arm coming into contact with the wheel assembly support.

8. The towed agricultural implement according to claim 7, wherein the second end of the arm includes an elbow comprising a first part extending from the carrying member and a second part extending at an angle to the first part, the second part including an inner vertical surface and a vertical end surface.

9. The towed agricultural implement according to claim 1, wherein the movement of each wheel mount with respect to the wheel assembly supports is between a first end position and a second end position, the first and second end positions of a first wheel assembly at a first free end of the wheel assembly support being substantially parallel to the first and second end positions of a second wheel assembly at a second end of the wheel assembly support.

10. The towed agricultural implement according to claim 1, wherein the chassis comprises a longitudinal element and a lateral element having first and second ends, the lateral element being connected to a second end of the longitudinal element, the left wheel assembly support located at the first end of the lateral element and the right wheel assembly support located at the second end of the lateral element.

11. The towed agricultural implement according to claim 10, wherein the wheel assembly supports are pivotably mounted at the ends of the lateral element for movement about a pivot axis.

12. The towed agricultural implement according to claim 1, wherein the at least one processing unit comprises a rotor for a rake or a tedder.

13. The towed agricultural implement according to claim 1, further comprising a support configured to connect the at least one processing unit to a towing vehicle.

* * * * *